(12) United States Patent
Siegel et al.

(10) Patent No.: US 6,944,768 B2
(45) Date of Patent: Sep. 13, 2005

(54) SYSTEM AND METHODS FOR ACCESS CONTROL UTILIZING TWO FACTORS TO CONTROL ACCESS

(75) Inventors: William G. Siegel, Wellington, FL (US); George W. McClurg, Jensen Beach, FL (US); Greg L. Cannon, Boynton Beach, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

(21) Appl. No.: 10/125,646

(22) Filed: Apr. 19, 2002

(65) Prior Publication Data

US 2003/0200446 A1 Oct. 23, 2003

(51) Int. Cl.$^7$ .............................. H04K 1/00; G06K 9/00
(52) U.S. Cl. ........................ 713/186; 713/202; 382/115
(58) Field of Search ................................ 713/186, 200, 713/201, 202; 382/115, 124

(56) References Cited

U.S. PATENT DOCUMENTS

| | | | |
|---|---|---|---|
| 2,500,017 A | 3/1950 | Altman | |
| 3,200,701 A | 8/1965 | White | |
| 3,475,588 A | 10/1969 | McMaster | |
| 3,482,498 A | 12/1969 | Becker | |
| 3,495,259 A | 2/1970 | Rocholl et al. | |

(Continued)

FOREIGN PATENT DOCUMENTS

| | | |
|---|---|---|
| EP | 0 101 772 A1 | 3/1984 |
| EP | 0 308 162 A3 | 3/1989 |
| EP | 0 308 162 A2 | 3/1989 |
| EP | 0 379 333 A1 | 7/1990 |
| EP | 0 623 890 A2 | 11/1994 |

(Continued)

OTHER PUBLICATIONS

Copy of International Search Report for Appln. No. PCT/US03/12280, mailed Aug. 13, 2003, 4 pages.

(Continued)

*Primary Examiner*—Gilberto Barrón, Jr.
*Assistant Examiner*—A. Nobahar
(74) *Attorney, Agent, or Firm*—Sterne, Kessler, Goldstein & Fox P.L.L.C.

(57) ABSTRACT

A system and methods controls access to an accessed system utilizing a two-factor requirement for admittance. One factor may be biometric data read and extracted from an individual wishing to gain access to the accessed system. The other factor may be an electronic key signal received at an input device of the access control system that is converted to an input signal. In some instances, the input signal is used to access correlating biometric data in a memory. Then, the extracted live biometric data and the stored biometric data are compared to generate a matching result signal. The matching results signal is transmitted to a Wiegand access control panel to control access to the accessed system. In other instances, the extracted live biometric data is compared to biometric data stored in a memory corresponding to a plurality of individual's biometric data that are allowed access to the accessed system. If there is a match, an ID biometric signal is generated and transmitted to the Wiegand access control panel. Along with the ID biometric signal, and ID input signal is transmitted from an input device to the Wiegand access control panel, where the ID input signal is based on receiving an electronic key at the input device. Then, based on a comparison between the ID biometric signal and the ID input signal, the Wiegand access control panel controls access to the accessed system.

9 Claims, 3 Drawing Sheets

U.S. PATENT DOCUMENTS

| | | |
|---|---|---|
| 3,527,535 A | 9/1970 | Monroe |
| 3,540,025 A | 11/1970 | Levin et al. |
| 3,617,120 A | 11/1971 | Roka |
| 3,699,519 A | 10/1972 | Campbell |
| 3,906,520 A | 9/1975 | Phillips |
| 3,947,128 A | 3/1976 | Weinberger et al. |
| 3,968,476 A | 7/1976 | McMahon |
| 3,975,711 A | 8/1976 | McMahon |
| 4,032,975 A | 6/1977 | Malueg et al. |
| 4,063,226 A | 12/1977 | Kozma et al. |
| 4,120,585 A | 10/1978 | DePalma et al. |
| 4,152,056 A | 5/1979 | Fowler |
| 4,209,481 A | 6/1980 | Kashiro et al. |
| 4,210,899 A | 7/1980 | Swonger et al. |
| 4,253,086 A | 2/1981 | Szwarcbier |
| 4,322,163 A | 3/1982 | Schiller |
| 4,414,684 A | 11/1983 | Blonder |
| 4,537,484 A | 8/1985 | Fowler et al. |
| 4,544,267 A | 10/1985 | Schiller |
| 4,553,837 A | 11/1985 | Marcus |
| 4,601,195 A | 7/1986 | Garritano |
| 4,669,487 A | 6/1987 | Frieling |
| 4,681,435 A | 7/1987 | Kubota et al. |
| 4,684,802 A | 8/1987 | Hakenewerth et al. |
| 4,701,772 A | 10/1987 | Anderson et al. |
| 4,783,823 A | 11/1988 | Tasaki et al. |
| 4,784,484 A | 11/1988 | Jensen |
| 4,792,226 A | 12/1988 | Fishbine et al. |
| 4,811,414 A | 3/1989 | Fishbine et al. |
| 4,876,726 A | 10/1989 | Capello et al. |
| 4,905,293 A | 2/1990 | Asai et al. |
| 4,924,085 A | 5/1990 | Kato et al. |
| 4,933,976 A | 6/1990 | Fishbine et al. |
| 4,942,482 A | 7/1990 | Kakinuma et al. |
| 4,946,276 A | 8/1990 | Chilcott |
| 4,995,086 A | 2/1991 | Lilley et al. |
| 5,054,090 A | 10/1991 | Knight et al. |
| 5,067,162 A | 11/1991 | Driscoll, Jr. et al. |
| 5,067,749 A | 11/1991 | Land |
| 5,131,038 A | 7/1992 | Puhl et al. |
| 5,146,102 A | 9/1992 | Higuchi et al. |
| 5,157,497 A | 10/1992 | Topper et al. |
| 5,185,673 A | 2/1993 | Sobol |
| 5,187,747 A | 2/1993 | Capello et al. |
| 5,210,588 A | 5/1993 | Lee |
| 5,222,152 A | 6/1993 | Fishbine et al. |
| 5,222,153 A | 6/1993 | Beiswenger |
| 5,230,025 A | 7/1993 | Fishbine et al. |
| 5,233,404 A | 8/1993 | Lougheed et al. |
| 5,249,370 A | 10/1993 | Stanger et al. |
| 5,253,085 A | 10/1993 | Maruo et al. |
| 5,261,266 A | 11/1993 | Lorenz et al. |
| 5,285,293 A | 2/1994 | Webb et al. |
| 5,291,318 A | 3/1994 | Genovese |
| D348,445 S | 7/1994 | Fishbine et al. |
| 5,351,127 A | 9/1994 | King et al. |
| D351,144 S | 10/1994 | Fishbine et al. |
| 5,363,318 A | 11/1994 | McCauley |
| 5,384,621 A | 1/1995 | Hatch et al. |
| 5,412,463 A | 5/1995 | Sibbald et al. |
| 5,416,573 A | 5/1995 | Sartor, Jr. |
| 5,448,649 A | 9/1995 | Chen et al. |
| 5,467,403 A | 11/1995 | Fishbine et al. |
| 5,469,506 A | 11/1995 | Berson et al. |
| 5,471,240 A | 11/1995 | Prager et al. |
| 5,473,144 A | 12/1995 | Mathurin, Jr. |
| 5,483,601 A | 1/1996 | Faulkner |
| 5,509,083 A | 4/1996 | Abtahi et al. |
| 5,517,528 A | 5/1996 | Johnson |
| 5,528,355 A | 6/1996 | Maase et al. |
| 5,548,394 A | 8/1996 | Giles et al. |
| 5,591,949 A | 1/1997 | Bernstein |
| 5,596,454 A | 1/1997 | Hebert |
| 5,598,474 A | 1/1997 | Johnson |
| 5,613,014 A | 3/1997 | Eshera et al. |
| 5,615,277 A | 3/1997 | Hoffman |
| 5,625,448 A | 4/1997 | Ranalli et al. |
| 5,640,422 A | 6/1997 | Johnson |
| 5,649,128 A | 7/1997 | Hartley |
| 5,650,842 A | 7/1997 | Maase et al. |
| 5,661,451 A | 8/1997 | Pollag |
| 5,680,205 A | 10/1997 | Borza |
| 5,689,529 A | 11/1997 | Johnson |
| 5,717,777 A | 2/1998 | Wong et al. |
| 5,729,334 A | 3/1998 | Van Ruyven |
| 5,736,734 A | 4/1998 | Marcus et al. |
| 5,745,684 A | 4/1998 | Oskouy et al. |
| 5,748,766 A | 5/1998 | Maase et al. |
| 5,748,768 A | 5/1998 | Sivers et al. |
| 5,755,748 A | 5/1998 | Borza |
| 5,757,278 A | 5/1998 | Itsumi |
| 5,767,989 A | 6/1998 | Sakaguchi |
| 5,778,089 A | 7/1998 | Borza |
| 5,781,647 A | 7/1998 | Fishbine et al. |
| 5,793,218 A | 8/1998 | Oster et al. |
| 5,801,681 A | 9/1998 | Sayag |
| 5,805,777 A | 9/1998 | Kuchta |
| 5,809,172 A | 9/1998 | Melen |
| 5,812,067 A | 9/1998 | Bergholz et al. |
| 5,815,252 A | 9/1998 | Price-Francis |
| 5,818,956 A | 10/1998 | Tuli |
| 5,822,445 A | 10/1998 | Wong |
| 5,825,005 A | 10/1998 | Behnke |
| 5,825,474 A | 10/1998 | Maase |
| 5,828,773 A | 10/1998 | Setlak et al. |
| 5,832,244 A | 11/1998 | Jolley et al. |
| 5,848,231 A | 12/1998 | Teitelbaum et al. |
| 5,855,433 A | 1/1999 | Velho et al. |
| 5,859,420 A | 1/1999 | Borza |
| 5,859,710 A | 1/1999 | Hannah |
| 5,862,247 A | 1/1999 | Fisun et al. |
| 5,867,802 A | 2/1999 | Borza |
| 5,869,822 A | 2/1999 | Meadows, II et al. |
| 5,872,834 A | 2/1999 | Teitelbaum |
| 5,892,599 A | 4/1999 | Bahuguna |
| 5,900,993 A | 5/1999 | Betensky |
| 5,907,627 A | 5/1999 | Borza |
| 5,920,384 A | 7/1999 | Borza |
| 5,920,640 A | 7/1999 | Salatino et al. |
| 5,928,347 A | 7/1999 | Jones |
| 5,942,761 A | 8/1999 | Tuli |
| 5,946,135 A | 8/1999 | Auerswald et al. |
| 5,960,100 A | 9/1999 | Hargrove |
| 5,973,731 A | 10/1999 | Schwab |
| 5,974,162 A | 10/1999 | Metz et al. |
| 5,987,155 A | 11/1999 | Dunn et al. |
| 5,991,467 A | 11/1999 | Kamiko |
| 5,995,014 A | 11/1999 | DiMaria |
| 5,999,307 A | 12/1999 | Whitehead et al. |
| 6,018,739 A | 1/2000 | McCoy et al. |
| 6,023,522 A | 2/2000 | Draganoff et al. |
| 6,038,332 A | 3/2000 | Fishbine et al. |
| 6,041,372 A | 3/2000 | Hart et al. |
| 6,055,071 A | 4/2000 | Kuwata et al. |
| 6,064,398 A | 5/2000 | Ellenby et al. |
| 6,064,753 A | 5/2000 | Bolle et al. |
| 6,064,779 A | 5/2000 | Neukermans et al. |
| 6,072,891 A | 6/2000 | Hamid et al. |
| 6,075,876 A | 6/2000 | Draganoff |
| 6,078,265 A | 6/2000 | Bonder et al. |
| 6,088,585 A | 7/2000 | Schmitt et al. |

| | | | |
|---|---|---|---|
| 6,097,873 A | | 8/2000 | Filas et al. |
| 6,102,286 A | * | 8/2000 | Hammond ................. 235/380 |
| 6,104,809 A | | 8/2000 | Berson et al. |
| 6,115,484 A | | 9/2000 | Bowker et al. |
| 6,122,394 A | | 9/2000 | Neukermans et al. |
| 6,144,408 A | | 11/2000 | MacLean |
| 6,150,665 A | | 11/2000 | Suga |
| 6,154,285 A | | 11/2000 | Teng et al. |
| 6,157,952 A | * | 12/2000 | Geiszler et al. ............. 709/224 |
| 6,162,486 A | | 12/2000 | Samouilhan et al. |
| 6,166,787 A | | 12/2000 | Akins et al. |
| 6,178,255 B1 | | 1/2001 | Scott et al. |
| 6,195,447 B1 | | 2/2001 | Ross |
| 6,198,836 B1 | | 3/2001 | Hauke |
| 6,204,331 B1 | | 3/2001 | Sullivan et al. |
| 6,259,108 B1 | | 7/2001 | Antonelli et al. |
| 6,272,562 B1 | * | 8/2001 | Scott et al. .................. 710/16 |
| 6,281,931 B1 | | 8/2001 | Tsao et al. |
| 6,327,047 B1 | | 12/2001 | Motamed |
| 6,347,163 B2 | | 2/2002 | Roustaei |
| 6,434,259 B1 | * | 8/2002 | Hamid et al. ............... 382/115 |
| 6,618,806 B1 | * | 9/2003 | Brown et al. ............... 713/186 |
| 6,766,040 B1 | | 7/2004 | Catalano et al. ............ 382/115 |
| 2002/0030668 A1 | | 3/2002 | Hoshino et al. |
| 2002/0091937 A1 | * | 7/2002 | Ortiz ......................... 713/200 |
| 2002/0097142 A1 | * | 7/2002 | Janiak et al. ............... 340/5.53 |
| 2002/0174357 A1 | * | 11/2002 | Davis et al. ................ 713/200 |
| 2002/0181747 A1 | * | 12/2002 | Topping ..................... 382/124 |

FOREIGN PATENT DOCUMENTS

| | | |
|---|---|---|
| EP | 0 623 890 A3 | 11/1994 |
| EP | 0 653 882 A1 | 5/1995 |
| EP | 0 379 333 B1 | 7/1995 |
| EP | 0 889 432 A3 | 1/1999 |
| EP | 0 889 432 A2 | 1/1999 |
| EP | 0 905 646 A1 | 3/1999 |
| EP | 0 785 750 B1 | 6/1999 |
| EP | 0 924 656 A2 | 6/1999 |
| EP | 0 623 890 B1 | 8/2001 |
| GB | 2 089 545 A | 6/1982 |
| GB | 2 313 441 A | 11/1997 |
| JP | WO 87/02491 A1 | 4/1987 |
| JP | 62-212892 A | 9/1987 |
| JP | 1-205392 A | 8/1989 |
| JP | 3-161884 A | 7/1991 |
| JP | 3-194674 A | 8/1991 |
| JP | 3-194675 A | 8/1991 |
| JP | 11-225272 A | 8/1999 |
| JP | 11-289421 A | 10/1999 |
| WO | WO 90/03820 A1 | 4/1990 |
| WO | WO 92/11608 A1 | 7/1992 |
| WO | WO 94/22371 A3 | 10/1994 |
| WO | WO 94/22371 A2 | 10/1994 |
| WO | WO 96/17480 A2 | 6/1996 |
| WO | WO 96/17480 A3 | 6/1996 |
| WO | WO 97/29477 A1 | 8/1997 |
| WO | WO 97/41528 A1 | 11/1997 |
| WO | WO 98/09246 A1 | 3/1998 |
| WO | WO 98/12670 A1 | 3/1998 |
| WO | WO 99/12123 A1 | 3/1999 |
| WO | WO 99/26187 A1 | 5/1999 |
| WO | WO 99/40535 A1 | 8/1999 |

OTHER PUBLICATIONS

"Bioscrypt To Offer a More Powerful, Cost Effective OEM Solution" Copyright 2001 PR Newswire Association, Inc., Oct. 1, 2001, 2 pages.

Btt (Biometric Technology Today), Finger technologies contacts, 2 pages.

Drake, M.D. et al., "Waveguide hologram fingerprint entry device," *Optical Engineering*, vol. 35, No. 9, Sep. 1996, pp. 2499–2505.

Roethenbaugh, G. (ed.), *Biometrics Explained*, 1998, ICSA, pp. 1–34.

*Automated Identification Systems* (visited May 20, 1999) <http://www.trw.com/idsystems/bldgacess2.html>, 1 page, Copyright 1999.

*Ultra–Scan Corporation Home Page* (visited May 20, 1999) <http://www.ultra–scan.com/index.htm>, 3 pages. (discusses technology as early as 1996).

*Profile* (last updated Aug. 16, 1998) <http://www.dermalog.de/Britain/Profile/profile.htm>, 3 pages. (discusses technology as early as 1990).

*ID–Card System Technical Specifications* (last updated Jul. 18, 1998) <http://dermalog.de/Britain/Products/ID–Card/idcard2.htm>, 2 pages.

*Fujitsu Limited Products and Services* (updated Apr. 21, 1999) <http://www.fujitsu.co.jp/hypertext/Products/index–e.html>, 3 pages, Copyright 1995–1999.

*SonyDCam* (visited May 20, 1999) <http://www.micrsoft.com/DDK/ddkdocs/Win2k/sonydcam.htm>, 3 pages, Copyright 1999.

*Verid Fingerprint Verification* (visited May 17, 1999) <http://www.tssi.co.uk/products/finger.html>, 2 pages.

*Startek's Fingerprint Verification Products: Fingerguard FG–40* (visited May 18, 1999) <http://www.startek.com.tw/product/fg40/fg40.html>, 3 pages.

*SAC Technologies Showcases Stand–Alone SAC–Remote(TM)* (visited May 18, 1999) <http://www.pathfinder.com/money/latest/press/PW/1998Mar25/1026.html>, 2 pages.

"Biometrics, The Future Is Now," www.securitymagazine.com, May 1999, pp. 25–26.

*Mytec Technologies Gateway,* (visited Apr. 27, 1999) <http://www.mytec.com/Products/gateway/>, 1 page.

*Mytec Technologies Gateway: Features & Benefits,* (visited Apr. 27, 1999) <http://www.mytec.com/Products/gateway/features.htm>,1 page.

*Mytec Technologies Touchstone Pro,* (visited Apr. 27, 1999) <http://www.mytec.com/Products/Touchstone/>, 1 page.

*Mytec Technologies Touchstone Pro: Features,* (visited Apr. 27, 1999) <http://www.mytec.com/Products/Touchstone/features.htm>, 1 page.

*Electronic Timeclock Systems and Biometric Readers* (last updated Apr. 17, 1999) <http://www.lfe–hr–bene.com/tclocks.html>, 1 page.

*Fingerprint Time Clock* (visited May 17, 1999) <http://www.lfs–her–bene.com/Biometrics/Fingerprintclock.html>, 6 pages.

*KC–901: The KSI fingerprint sensor* (visited May 17, 1999) <http://www.kinetic.bc.ca/kc–901.html>, 3 pages.

*Intelnet Inc.* (visited May 20, 1999) <http://www.intelgate.com/index.html>, 1 page, Copyright 1996.

*Ver–i–Fus Fingerprint Access Control System* (visited May 20, 1999) <http://www.intelgate.com/verifus.htm>, 2 pages. (Ver–i–fus product released in 1995).

*Ver–i–fus® Configurations* (visited May 20, 1999) <http://www.intelgate.com/verconfig.htm>, 1 page. (Ver–i–fus product released in 1995).

*Ver–i–Fus® & Ver–i–Fus$^{mil}$®* (visited May 20, 1999) <http://www.intelgate.com/vif_data.htm>, 3 pages.(Ver-f-fus product released in 1995).

*Access Control System Configurations* (visited May 20, 1999) <http://www.intelgate.com/access.htm>, 2 pages. (Ver–i–fus product released in 1995).
*Company* (visited May 17, 1999) <http://www.instainfo.com.company.htm>, 2 pages.
*TouchLock™ II Fingerprint Identity Verification Terminal* (visited May 17, 1999). <http://www.identix.com/TLock.htm>, 4 pages.
*Physical Security and Staff Tracking Solutions* (visited May 17, 1999) <http://www.identix.com/products/biosecurity.html>, 3 pages, Copyright 1996–1998.
*Veriprint2000 Fingerprint Verification Terminal For Use With Jantek Time & Attendance Software* (visited May 17, 1999) <http://www.hunterequipment.com/fingerprint.htm>, 2 pages.
*Veriprint Product Applications* (visited Apr. 27, 1999) <http://www.biometricid.com/uses.htm>, 1 page, Copyright 1999.
*BII Home Page* (visited Apr. 27, 1999) <http://www.biometricid.com/homepage.htm>, 1 page, Copyright 1999.
*Veriprint 2100 Stand–Alone Fingerprint Verification Terminal* (visited Apr. 27, 1999) <http://www.biometricid.com/veriprint2100.htm>, 3 pages.
Randall, N. "A Serial Bus on Speed," *PC Magazine,* May 25, 1999, pp. 201–203.
*The DERMALOG Check–ID* (visited Nov. 12, 1999) <http://www.dermalog.de/ganzneu/products_check.html>, 1 page.
*Check–ID Specifications and Features* (visited Nov. 12, 1999) <http://www.dermalog.de/ganzneu/spec_check.html>, 1 page, Copyright 1999.
*Startek's Fingerprint Verification Products: FingerFile 1050* (visited Oct. 8, 1999) <http://www.startek.com.tw/product/ff1050.html>, 3 pages.
*Time is Money!* (visited Jun. 5, 1998) <http://www.iaus.com/afim.htm>, 3 pages.
*LS 1 LiveScan Booking Workstation High Performance Finger & Palm Scanning System* (visited Jun. 4, 1998) <http://www.hbs–jena.com/ls1.htm>, 6 pages, Copyright 1998.
*Welcome to the Homepage of Heimann Biometric Systems GMBH* (visited Jun. 4, 1998) <http://www.hbs–jena.com/>, 1 page, Copyright 1998.
*Heimann Biometric Systems Corporate Overview* (visited Jun. 4, 1998) <http://www.hbs–jena.com/company.htm>, 4 pages, Copyright 1998.
*Remote Access Positive IDentification—raPID* (visited Jun. 3, 1998) <http://www.nec.com/cgi–bin/showproduct.exe?pro. . . emote⇆Access+Positive+IDentification+%2D+raPID>, 2 pages, Copyright 1997.
*Morpho DigiScan Cellular* (visited Jun. 3, 1998). <http://www.morpho.com/products/law_enforcement/digiscan/cellular.htm>, 2 pages, Copyright 1998.
*A.F.I.S.* (last updated April 2, 1998) <http://www.dermalog.de/afis.htm>, 2 pages.
*Morpho FlexScan Workstation* (visited Jun. 3, 1998). <http://www.morpho.com/products/law_enforcement/flexscan/>, 2 pages, Copyright 1998.
True–ID® The LiveScan with special "ability". . . , 2 pages.
*Printrak International: User List* (visited Jun. 3, 1998) <http://www.printrakinternational.com and links>, 10 pages, Copyright 1996.
*Live–Scan Products: Tenprinter® 1133S* (visited Apr. 23, 1999). <http://www.digitalbiometrics.com/Products/tenprinter.htm>, 4 pages. (Tenprinter 1133S released in 1996).

*TouchPrint™ 600 Live–Scan System* (visited Nov. 17, 1999) <http://www.identix.com/products/livescan.htm>, 4 pages, Copyright 1996–1998.
Systems for Live–Scan Fingerprinting, Digital Biometrics, Inc., 8 pages, Copyright 1998.
DBI FingerPrinter CMS, Digital Biometrics, Inc., 5 pages. (CMS released in 1998).
Fingerscan V20, Identix Incorporated, 1 page, Copyright 1999.
Verid Fingerprint Reader, TSSI, 4 pages.
Response to Request for Information, Cross Match Technologies, Inc., 13 pages, Apr. 14, 1999.
*Startek's Fingerprint Verification Products* (visited Nov. 17, 1999) <http://www.startek.com/tw/product/index.html>, 1 page.
*Introduction to Startek's Fingerprint Verification Products* (visited Nov. 17, 1999) <http://www.startek.com.tw/product/index2.html>, 2 pages.
*Automatic Fingerprint Identification Systems* (visited Nov. 17, 1999) <http://www.sagem.com/en/produit4–en/empreinte–dig–en.htm>, 1 page.
*Digital Biometrics Corporate Information* (visited Nov. 17, 1999) <http://www.digitalbiometrics.com/Corporate_info/Corporate_info.htm>, 2 pages. (discusses technology as early as 1985).
*DBI Live–Scan Products: Digital Biometrics Tenprinter* (visited Nov. 17, 1999) <http://www.digitalbiometrics.com/products/tenprinter.htm>, 4 pages. (Tenprinter released in 1996).
*DBI Live–Scan Products: Networking Options* (Visited Nov. 17, 1999) <http://www.digitalbiometrics.com/products/networking_options.htm>, 3 pages.
*DBI Live–Scan Products: Digital Biometrics FingerPrinter CMS* (visited Nov. 17, 1999) <http://www.digitalbiometrics.com/products/FingerPrinterCMS.htm>, 3 pages. (CMS released in 1998).
*DBI Live–Scan Products: Image Printer Stations* (visited Nov. 17, 1999) <http://www.digitalbiometrics.com/products/imageprinter.htm>, 2 pages.
*DBI Live–Scan Products: FC–21 Fingerprint Capture Station* (visited Nov. 17, 1999) <http://www.digitalbiometrics.com/products/Fingerprintcapture.htm>, 2 pages.
*Series 400 OEM Scanner* (visited Nov. 17, 1999) <http://www.ultra–scan.com/400.htm>, 3 pages. (Scanner released in 1996).
*USC Scanner Design* (visited Nov. 17, 1999) <http://www.ultra–scan.com/scanner.htm>, 4 pages. (Scanner released in 1996).
*Series 500/600 Scanners* (visited Nov. 17, 1999) <http://www.ultra–scan.com/500.htm>, 3 pages. (Scanner released in 1996).
*Series 700 ID Station* (visited Nov. 17, 1999) <http://www.ultra–scan.com/700.htm>, 3 pages. (Scanner released in 1998).
*Identix: The Corporation* (visited Nov. 17, 1999) <http://www.identix.com/corporate/home.htm>, 2 pages, Copyright 1996–1998.
*Biometric Imaging Products* (visited Nov. 17, 1999) <http://www.identix.com/products/bioimage.htm>, 1 page, Copyright 1996–1998.
*TouchPrint™ 600 Live–Scan System* (visited Apr. 23, 1999) <http://www.identix.com/products/livescan.htm>, 4 pages, Copyright 1996–1998.

*TouchPrint™ 600 Palm Scanner* (visited Nov. 17, 1999) <http://www.identix.com/products/palmscan.htm>, 3 pages, Copyright 1996–1998.
*TouchPrint™ 600 Card Scan System* (visited Nov. 17, 1999) <http://www.identix.com/products/cardscan.htm>, 3 pages, Copyright 1996–1998.
*DERMALOG Key—The safest and easiest way of access control* (Last updated Jul. 18, 1998) <http://www.dermalog.de/Britain/Products/Key/key.htm>, 1 page.
*DERMALOG Finger–ID Your small size solution for high security* (Last updated Jul. 18, 1998) <http://www.dermalog.de/Britain/Products/Finger/fingerid.htm>, 1 page.
*Mytec: Corporate* (visited Nov. 17, 1999) <http://www.mytec.com/corporate/>, 2 pages.
*Kinetic Sciences Inc. Fingerprint Biometrics Division* (visited Nov. 17, 1999) <http://www.kinetic.bc.ca/main–FPB.html>, 1 page.
*Fingerprint Biometrics: Securing The Next Generation*, May 19, 1999, (visited Nov. 17, 1999) <http://www.secugen.com/pressrel.htm>, 2 pages.
*Secugen Unveils Fully Functional Fingerprint Recognition Solutions*, May 11, 1999, (visited Nov. 17, 1999) <http://www.secugen.com/pressrel.htm>, 3 pages.
*POLLEX Technology Ltd., The Expert in Fingerprint Identification—POLLog* (visited Nov. 17, 1999) <http://www.pollex.ch/english/products/pollog.htm>, 2 pages.
*Sony Fingerprint Identification Terminal* (visited Nov. 17, 1999). <http://www.iosoftware.com/biosols/sony/fiu/applications.fit100.htm>, 2 pages.
*Sony Fingerprint Identification Unit (FIU–700)* (visited Nov. 17, 1999). <http://www.iosoftware.com/biosols/sony/fiu70/index.htm>, 2 pages. (Unit available late 1999).
*Sony Fingerprint Indentification Unit* (visited Nov. 17, 1999). <http://www.iosoftware.com/biosols/sony/fiu/index.htm>, 3 pages.
*Fujitsu Fingerprint Recognition Device (FPI–550)* (visited Nov. 17, 1999). <http://www.iosoftware.com/biosols/fujitsu/fpi550.htm>, 2 pages.
*Mitsubishi MyPass LP–1002* (visited Nov. 17, 1999). <http://www.iosoftware.com/biosols/mitsubishi/mypass.htm>, 2 pages.
*SecureTouch PV—A Personal Password Vault* (visited Nov. 17, 1999) <http://www.biometricacess.com/securetouch_pv.htm>, 1 page.
*Digital Descriptor Systems, Inc.–Profile* (visited Nov. 17, 1999) <http://www.ddsi–cpc.com/pages/profile.html>, 3 pages.
*Press Release: Printrak International Announces New Portable Fingerprint ID Solution*, Dec. 10, 1996, (visited Nov. 17, 1999) <http://www.scott.net/~dg/25.htm>, 3 pages.
*Corporate Profile* (visited Nov. 17, 1999) <http://www.printrakinternational.com/corporate.htm>, 1 page.
*Printrak Products* (visited Nov. 17, 1999). <http://www.printrakinternational.com/Products.htm>, 1 page. (Discuss technology as early as 1974).
Verifier™ 200 Fingerprint Capture Devices, Cross Match Technologies, Inc., 2 pages, 1996–1997.
Verifier 200 Direct Fingerprint Reader, Cross Check Corporation, 2 pages, 1996–1997.
Verifier™ 250 Fingerprint Capture Devices, Cross Match Technologies, Inc., 2 pages, 1996–1997.
Verifier 250 Small Footprint Direct Fingerprint Reader, Cross Check Corporation, 2 pages, 1996–1997.
Verifier™ 290 Fingerprint Capture Devices, Cross Match Technologies, Inc., 2 pages, 1996–1997.
Verifier 290 Direct Rolled Fingerprint Reader, Cross Check Corporation, 2 pages, 1996–1997.
Verifier™ 500 Fingerprint Capture Devices, Cross Match Technologies, Inc., 2 pages, 1998.
Biometric terminal, 1 page.
10–Print Imaging System, Cross Check Corporation, 2 pages, 1998.
*Cross Match Technologies. Inc.* (visited Mar. 25, 1999) <http://www.crossmatch.net/>, 1 page.
*Cross Match Technologies, Inc. —Products Overview* (visited Mar. 25, 1999) <http://www.crossmatch.net/new/products/products–index.html>, 1 page.
*Cross Match Technologies, Inc.—Law Enforcement Systems* (visited Mar. 25, 1999) <http://www.crossmatch.net/new/law/law–index.html>, 2 pages.
*Cross Match Technologies, Inc.—Commercial Systems: Building On The Standard* (visited Mar. 25, 1999) <http://www.crossmatch.net/new/commercial/commercial–index.html>, 2 pages.
*Cross Match Technologies, Inc. —International Sales* (visited Mar. 25, 1999) <http://www.crossmatch.net/new/sales/sales–index.html>, 1 page.
*Cross Match Technologies, Inc.—Support* (visited Mar. 25, 1999) <http://www.crossmatch.net/new/support/support–index.html>, 1 page.
*Cross Match Technologies, Inc.—News—Press Releases—Verifier 400 Press Release* (visited Mar. 25, 1999) <http://www.crossmatch.net/new/news/news–pr–050798.html>, 1 page.
*Global Security Fingerscan™ System Overview* (visited Jan. 11, 2000). <http://wwwu–net.com/mbp/sol/g/a9.htm>, 12 pages.
"Command Structure for a Low–Cost (Primitive) Film Scanner," *IBM Technical Disclosure Bulletin*, IBM Corp., vol. 35, No. 7, Dec. 1992, pp. 113–121.
*Fingerprint Scan API Toolkit Version 1.x Feature List* (Apr. 26, 2000) <http://www.mentalix.com/api/archive_fapivl.htm>, 3 pages.
"Image Acquisition System," *IBM Technical Disclosure Bulletin*, IBM Corp., vol. 29, No. 5, Oct. 1986, pp. 1928–1931.
Kunzman, Adam J. and Wetzel, Alan T., "1394 High Performance Serial Bus: The Digital Interface for ATV," *IEEE Transaction on Consumer Electronics*, IEEE, vol. 41, No. 3, Aug. 1995, pp. 893–900.
*Mentalix Provides The First IAFIS–Certified Latent Print Scanning Solution For Windows* (Jul. 23, 1999) <http://www.mentalix.com/pressreleases/fprintlook3_prel.htm>, 2 pages.
Sluijs, F. et al., "An On–chip USB–powered Three–Phase Up/down DC/DC Converter in a Standard 3.3V CMOS Process," *2000 IEEE International Solid–State Circuits Conference*, IEEE, Feb. 9, 2000, pp. 440–441.
Venot, A. et al., "Automated Comparison of Scintigraphic Images," *Journal of Nuclear Medicine*, vol. 27, No. 8, Aug. 1986, pp. 1337–1342.
English–language Abstract for Japanese Patent Publication No. 59–103474, published Jun. 14, 1984, printed from espacenet.com, 1 page.
English–language Abstract for Japanese Patent Publication No. 62–212892, published Sep. 16, 1987, printed from espacenet.com, 1 page.

English–language Abstract for Japanese Patent Publication No. 1–205392, published Aug. 17, 1989, printed from espacenet.com, 1 page.

English–language Abstract for Japanese Patent Publication No. 3–161864, published Jul. 11, 1991, printed from espacenet.com, 1 page.

English–language Abstract for Japanese Patent Publication No. 3–194674, published Aug. 26, 1991, printed from espacenet.com, 1 page.

English–language Abstract for Japanese Patent Publication No. 3–194675, published Aug. 26, 1991, printed from espacenet.com, 1 page.

English–language Abstract for Japanese Patent Publication No. 10–079017, published Mar. 24, 1998, printed from espacenet.com, 1 page.

English–language Abstract for Japanese Patent Publication No. 10–262071, published Sep. 29, 1998, printed from espacenet.com, 1 page.

English–language Abstract for Japanese Patent Publication No. 11–167630, published Jun. 22, 1999, printed from espacenet.com, 1 page.

English–language Abstract for Japanese Patent Publication No. 11–225272, published Aug. 17, 1999, printed from espacenet.com, 1 page.

English–language Abstract for Japanese Patent Publication No. 11–252489, published Sep. 17, 1999, printed from espacenet.com, 1 page.

English–language Abstract for Japanese Patent Publication No. 11–289421, published Oct. 19, 1999, printed from espacenet.com, 1 page.

* cited by examiner

SYSTEM AND METHODS FOR ACCESS CONTROL UTILIZING TWO FACTORS TO CONTROL ACCESS

BACKGROUND OF THE INVENTION

1. Field of the Invention

The present invention is directed to the field of access control and, in particular, to access control with biometric technology in conjunction with other data.

2. Background Art

Access control systems are used to limit access to selected individuals. Some access control systems use Wiegand interfaces and protocols for control based on receiving electronic keys, such as keypads, SmartCards (contact and contactless), key fob devices, or the like. Other access control systems use biometric technologies to determine whether access for an individual will be granted or denied. A biometric is a unique, measurable characteristic or trait of a human being for automatically recognizing or verifying identity. For instance, fingerprint biometrics are largely regarded as an accurate method of biometric identification and verification. See, e.g., Roethenbaugh, G. Ed., *Biometrics Explained* (International Computer Security Association: Carlisle, Pa. 1998), pages 1–34, which is herein incorporated by reference in its entirety. Access control units (ACUs) may be placed locally to perform a biometric analysis on the individual, and determine whether access will be granted or denied.

Although higher security access control systems require multiple factors to grant access to a secured item, many existing systems only provide for the use of one factor. Through the requirement of two factors there is a much lower change of false positives or false negatives during access control. Unfortunately, in an accessed control system where it is desired to implement a higher security system the entire existing system would have to be replaced to allow for two or more factors. Thus, companies wanting these higher level systems would need to reinstall access control systems in all accessed system areas, which is very undesirable because of the large costs involved.

What is needed is a two-factor system that can be arranged by retrofitting an existing system utilizing only one factor with a system utilizing another factor. This would enhance the existing systems ability to maintain higher levels of access control by using more than one factor when determining whether to admit or deny access, while substantially reducing the cost to a company wanting the higher level system.

BRIEF SUMMARY OF THE INVENTION

Embodiments of the present invention provide an access control system including an access controller, a matching system coupled to the access controller, and an extracting system coupled to the access controller. The system further includes a biometric reader coupled to the access controller, the extracting system, and the matching system and an input device coupled to the access controller. The system further includes a Wiegand access control panel coupled to the access controller and an accessed system coupled to the access controller.

Other embodiments of the present invention provide a method for controlling access including the steps of reading and extracting live biometric data, receiving an input signal, and accessing stored biometric data stored in a memory based on the input signal. The method further includes the steps of comparing the extracted biometric data with the stored biometric data, generating a comparison result and transmitting the comparison result to a Wiegand access control panel, and controlling access to an accessed system with the Wiegand access control panel based on the comparison result.

Other embodiments of the present invention provide a method for controlling access including the steps of reading and extracting biometric data, comparing the extracted biometric data with biometric data for a plurality of individuals stored in a memory to determine if the extracted biometric data matches one of the plurality of individuals stored biometric data, generating an ID biometric signal if the extracted biometric data matches the one of the plurality of individuals stored biometric data, and transmitting the ID biometric signal to a Wiegand access panel controller. The method further comprises the steps of receiving an input signal at an input device from an electronic key and converting the input signal into an ID input signal, transmitting the ID input signal to the Wiegand access panel controller, and comparing the ID biometric signal to the ID input signal in the Wiegand access panel controller to control access to an accessed system.

Advantages provided by using the system and methods according to embodiments of the present invention include the costs savings of retrofitting existing access control systems (either installed or $3^{rd}$ part product offerings) to allow for a second factor to be used during an access control operation. This retrofitting reduces the amount of wiring installation for a multiple factor access control system because existing wiring can be used. Through the requirement of two factors there is a much lower change of false positives or false negatives during access control.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Overview and Terminology

Embodiments of a system and methods for access control of an accessed system utilize a two-factor requirement for admittance. One factor may be biometric data read and extracted from an individual wishing to gain access to the accessed system. The other factor may be an electronic key signal received at an input device of the access control system that is converted to an input signal. Through the requirement of two factors there is a much lower change of false positives or false negatives during access control.

In some embodiments, the input signal is used to access correlating biometric data in a memory. Then, the extracted live biometric data and the stored biometric data are compared to generate a matching result signal. The matching result signal is transmitted to a Wiegand access control panel to control access to the accessed system.

In other embodiments, the extracted live biometric data is compared to biometric data stored in a memory corresponding to a plurality of individuals' biometric data that are allowed access to the accessed system. If there is a match, an ID biometric signal is generated and transmitted to the Wiegand access control panel. Along with the ID biometric signal, and ID input signal is transmitted from an input device to the Wiegand access control panel, where the ID input signal is based on receiving an electronic key at the input device. Then, based on a comparison between the ID biometric signal and the ID input signal, the Wiegand access control panel controls access to the accessed system.

Through the embodiments of the present invention, an existing Wiegand or biometric system utilizing a first factor for access control can be retrofitted with a system that uses a second factor for access control. This two-factor system enables a higher level of security to be achieved for an accessed system with a low installation cost.

Access Control System

Figure 1:
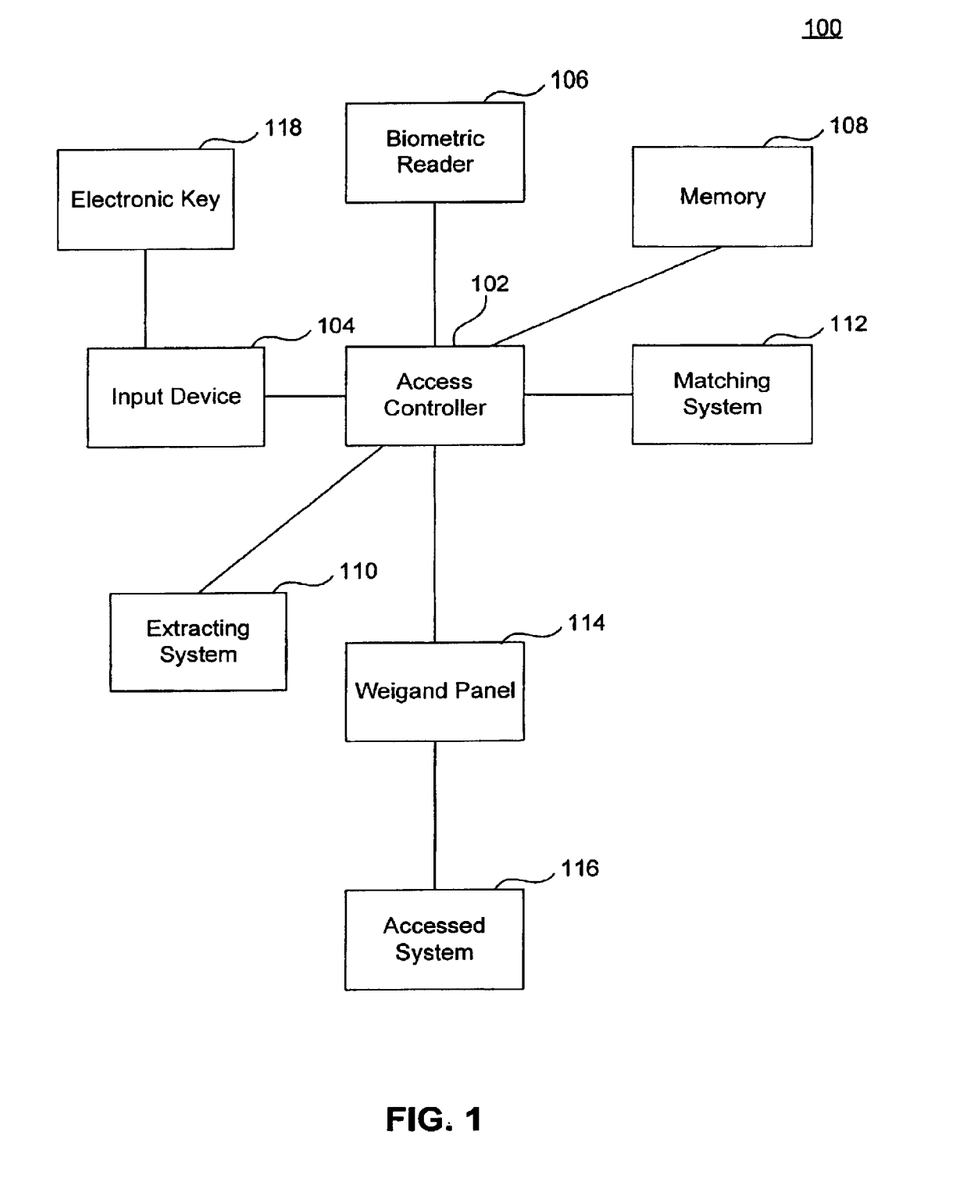
FIG. 1 shows an example access control system according to embodiments of the present invention.

With reference to FIG. 1, an access control system 100 is shown. The access control system 100 includes an access controller 102 that receives data from an input device 104 and a biometric reader 106. The access controller 102 is coupled to a memory 108, an extracting system 110, a matching system 112, and a Wiegand access control panel 114. An accessed system 116 is coupled to the Wiegand access control panel.

The input device 104 generates an input signal based on an electronic key 118, either through contact or through non-contact transmission from the electronic key 118. Mere examples of the electronic key 118 may be a keypad, a SmartCard, a key fob device, or any other known devices that perform similar functions. An accessed system 116 as used through the specification may be any known system that requires some limitation to entry, which can be a computer, electrical or mechanical equipment, a room, a hallway, a building, a section of a compound, etc. Biometric data may relate to any physical part of an individual, such as an eye, a finger, a limb, etc.

Thus, the system 100 according to embodiments of the present invention combines a biometric access system 106, 108, 110, and 112 with electronic key access system 104, 108, and 118. In this configuration, an accessed system 116 that requires a high level of security cannot be accessed without utilizing at least two factors, biometric data and an electronic key. By using the configuration of the embodiments, an existing access control system utilizing a first factor for access control can be easily retrofitted to couple with a system that allows it to use a second factor for access control. Through the requirement of two factors there is a much lower change of false positives or false negatives during access control.

Access Control Methods

Figure 2:
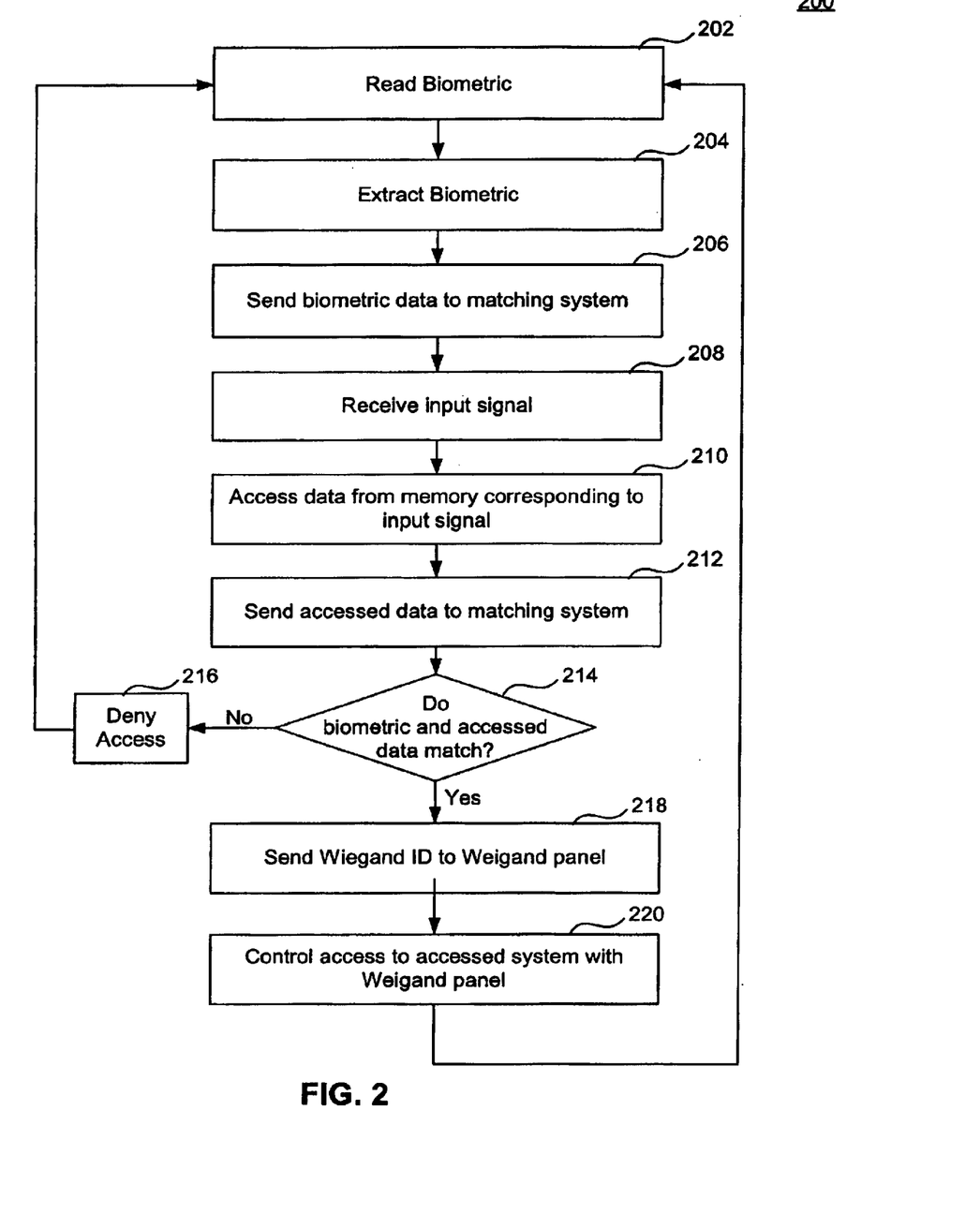
FIG. 2 shows example method steps for an access control method according to embodiments of the present invention.

A method 200 for access control according to embodiments of the present invention is shown in FIG. 2. Biometric data of an individual trying to access the accessed system 116 is read at step 202. The read biometric data is extracted by the extracting system 110 at step 204. The extracted biometric data is sent to the matching system 112 at step 206. An input signal is received at the input device 104 at step 208. Data stored in memory 108 corresponding to the input signal is accessed by the access controller 102 at step 210. The data may be stored biometric data for an individual corresponding to the input signal. The accessed data is sent to the matching system 112 at step 212. A determination is made at step 214 to see if the extracted biometric data and the accessed data match. If not, access is denied at step 216 and the method 200 returns to step 202 to wait for another individual who wants to access the accessed system 116. If yes, an ID signal, which may be a Wiegand ID signal, is sent from the access controller 102 to the Wiegand access control panel 114 at step 218. In turn, the Wiegand access control panel 114 sends a control signal to the access system 116 at step 220. The method 200 then returns to step 202 to wait for another individual who wants to access the accessed system 116.

Figure 3:
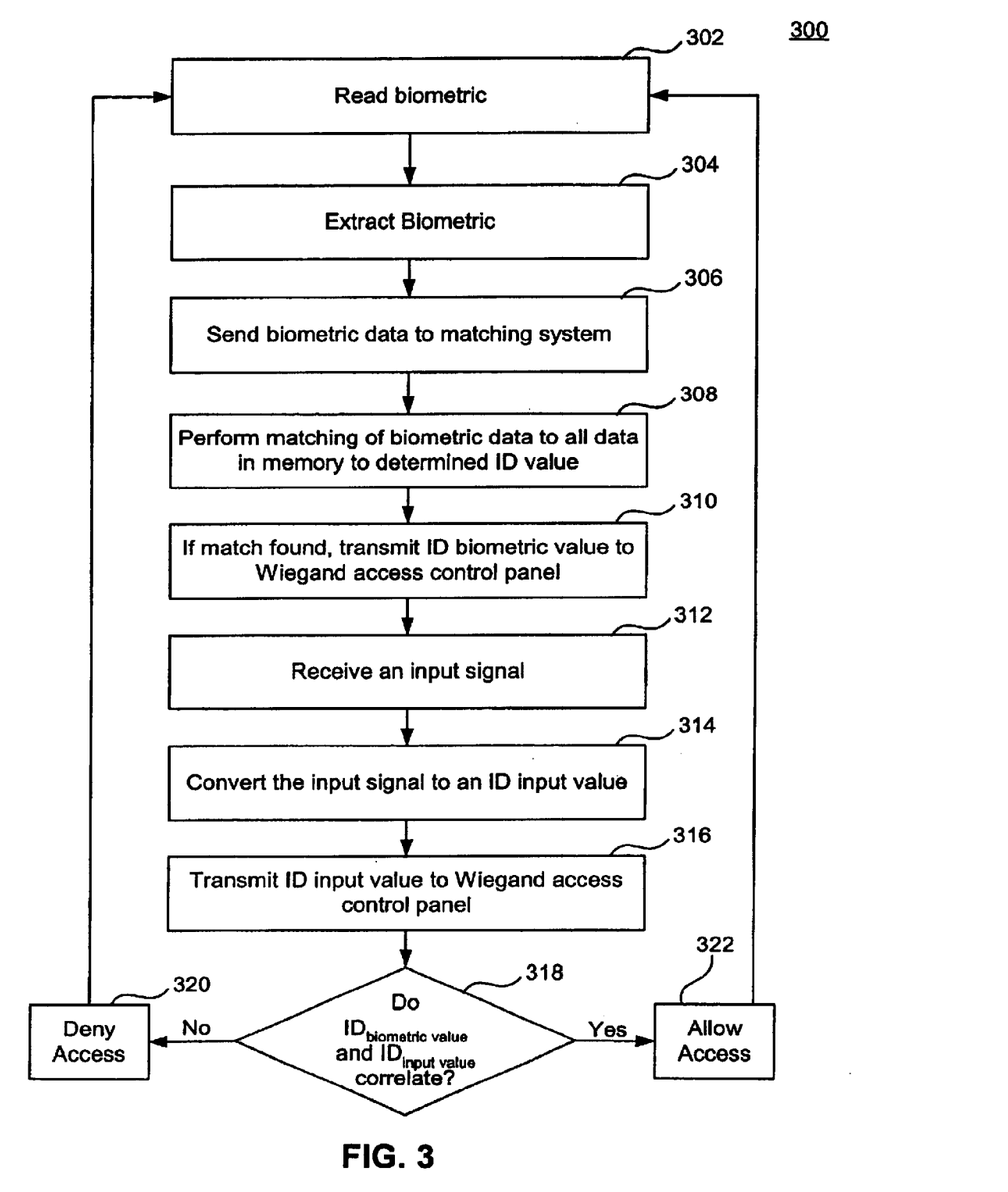
FIG. 3 shows example method steps for an access control method according to embodiments of the present invention.

Now turning to FIG. 3, another method 300 for controlling access to the accessed system 116 according to embodiments of the present invention is shown. Biometric data of an individual wanting to access the accessed system 116 is read by the biometric reader 106 at step 302. The read biometric data is extracted by the extracting system 110 at step 304. The extracted biometric data is sent to the matching system 112 at step 306. The matching system 112 compares the extracted biometric data to all the data stored in memory 108 to determine if the individual's data has been previously stored at step 308. If a match is found, an ID biometric signal is transmitted by the access controller 102 to the Wiegand access control panel 114 at step 310. An input signal is received at the input device 104 from an electronic key 118 at step 312. The input signal is converted into an ID input signal at step 314 and transmitted to the Wiegand access control panel 114 by the access controller 102 at step 316. A comparison is made between the ID biometric signal and the ID input signal to see if they correlate at step 318. If no, access to the accessed system 116 is denied at step 320. The method 300 then returns to step 302 to wait for another individual wanting access to the accessed system 116. If yes, access to the accessed system 116 is allowed by the Wiegand access control panel 114 at step 322. The method 300 then returns to step 302 to wait for another individual wanting access to the accessed system 116.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An access control system, comprising:
   an access controller;
   a matching system locally coupled to said access controller;
   an extracting system locally coupled to said access controller;
   a biometric reader locally coupled to said access controller, said extracting system, and said matching system;

an input device locally coupled to said access controller and locally coupled to a storage device;

a Wiegand access control panel locally coupled to the access controller and that receives a control signal from said access controller, and an accessed system locally coupled to said access controller, wherein the accessed system is accessed using the Wiegand access control panel after the access controller determines if biometric data extracted from a biometric image read by the biometric reader matches biometric data accessed from the storage device that corresponds to information received at the input device.

2. The access control system of claim 1, wherein said input device receives a signal from an electronic key.

3. The access control system of claim 1, wherein said input device is a keypad.

4. The access control system of claim 1, wherein said input device is a contact smartcard reader.

5. The access control system of claim 1, wherein said input device is a contactless smartcard reader.

6. The access control system of claim 1, wherein said input device is a key fob device reader.

7. The access control system of claim 1, wherein said input device utilizes a Wiegand interface standard.

8. A method for controlling access, comprising:

locally capturing a live biometric image and extracting live biometric data from the live biometric image;

locally receiving an input signal that is used to access stored biometric data stored in a local memory;

locally comparing said extracted live biometric data with said accessed stored biometric data;

locally generating a comparison result and locally transmitting said comparison result to a Wiegand access control panel; and controlling access to an accessed system with said Wiegand access control panel after receiving said comparison result.

9. An access control system comprising:

a biometric reader that captures a first type of information;

an extracting system that extracts live biometric information from the first type of information;

an input device that is used to capture a second type of information, the second type of information being used to access stored biometric information from a storage device;

a matching system that is used to compare the live biometric information to the stored biometric information to produce a result signal;

an access controller that generates a control signal corresponding to the result signal; and a Wiegand access control panel that receives the control signal from said access controller, such that an accessed system is accessed using the Wiegand access control panel only after the access controller determines that the extracted live biometric data corresponds to the accessed stored biometric information wherein the biometric reader, the extracting system, the input device, the matching system, the access controller, and the Wiegand access control panel are all positioned within a same area and relatively near the accessed system.

* * * * *

UNITED STATES PATENT AND TRADEMARK OFFICE
CERTIFICATE OF CORRECTION

| | |
|---|---|
| PATENT NO. | : 6,944,768 B2 |
| APPLICATION NO. | : 10/125646 |
| DATED | : September 13, 2005 |
| INVENTOR(S) | : Siegel et al. |

It is certified that error appears in the above-identified patent and that said Letters Patent is hereby corrected as shown below:

Item (56), page 3, References Cited, FOREIGN PATENT DOCUMENTS section, please replace "WO 90/03820" with --WO 90/03620--.

Signed and Sealed this

Eighteenth Day of August, 2009

David J. Kappos
*Director of the United States Patent and Trademark Office*